April 12, 1960 — E. C. H. BECKER ET AL — 2,932,474
VIBRATION MOUNT
Filed Oct. 7, 1957

INVENTORS
EUGENE C. H. BECKER
& VICTOR M. D'ATRE
BY Walter E. Rule
THEIR ATTORNEY

United States Patent Office 2,932,474
Patented Apr. 12, 1960

2,932,474

VIBRATION MOUNT

Eugene C. H. Becker, Endicott, N. Y., and Victor M. D'Atre, Caldwell, N.J., assignors to General Electric Company, a corporation of New York Application October 7, 1957, Serial No. 688,624

1 Claim. (Cl. 248—24)

The present invention relates to a vibration mount and is more particularly concerned with a vibration isolating and damping support for resiliently supporting a load relative to a base.

Resilient vibration damping mounts of the type with which the present invention is concerned are commonly employed as supports for fixedly located machinery for the purpose of protecting the machinery against shocks or vibrations resulting either from the handling or shipment thereof or from the normal operation of the machinery. For example, most of the compressors employed in the air conditioning field are resiliently supported both for the purpose of protecting the compressor during shipment and also to absorb the vibrations or oscillations occurring during normal use of the compressor particularly during the starting and stopping thereof.

It is a primary object of the present invention to provide a vibration mount including a combination of load supporting and snubbing compression springs designed to provide a non-linear isolating, snubbing and vibration damping action.

It is another object of the present invention to provide a compact vibration damping support for resiliently mounting a load relative to a base comprising a load supporting compression spring and a snubbing compression spring so constructed and arranged that the resistance of the vibration damping support to vibrations increases with increased amplitude of the vibrations.

Further objects and advantages of the invention will become apparent as the following description proceeds and the features of novelty which characterize the invention will be pointed out with particularity in the claim annexed to and forming a part of this specification.

In accordance with the present invention there is provided a vibration damping support for resiliently supporting a load relative to a base and limiting the vibration of the load relative to that base, the support comprising a spring assembly including a first or load-supporting compression spring arranged between the base and the load and a second or snubbing tapered or conical compression spring arranged to act in opposition to the load supporting spring. An essential feature of the present invention is the provision of a load supporting spring including a relatively cylindrical helical portion which under normal static load supporting conditions is adapted to be almost fully compressed by the load and a relatively tapered portion which is designed to provide a progressively increasing resistance to movements of the load as the vibration amplitude increases. The vibration damping support of the present invention is further characterized by an arrangement of the load supporting and snubbing springs such that the application of a maximum designed compressive vibratory force the relatively cylindrical portion of the load supporting spring is almost fully compressed or "bottomed" while under normal static load conditions the snubbing spring is substantially uncompressed.

For a better understanding of the invention reference may be had to the accompanying drawing in which.

Figure 1:
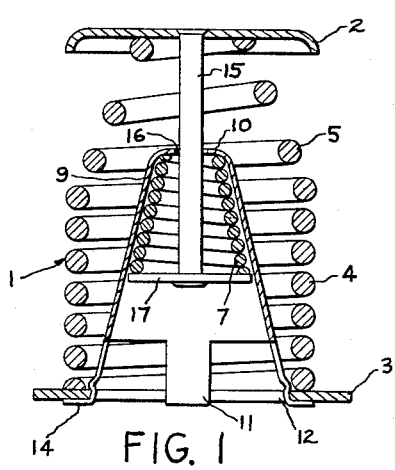
Fig. 1 is an elevational view, partially in section, of the vibration damping support of the present invention in its no-load position.

Referring to Fig. 1 of the drawing, there is shown one modification of the present invention comprising a main or load-supporting compression spring 1 arranged between and in contact with a load engaging member 2 and a base plate or member 3. This main spring includes a cylindrical helical portion 4 and a tapered or conical portion 5, both portions of which are directly subjected to and support the load carried by the load engaging member 2. Arranged within the load supporting spring 1 for cooperation therewith in eliminating or substantially reducing vibratory movement of the load carried by the member 2 relative to the base plate 3 is a tapered or conical helical compression spring 7.

The tapered or conical snubber spring 7 is arranged to provide a spring force in the direction opposite to that of the load supporting spring 1, or in other words a spring force in the same direction as that exerted by a load on the member 2. To obtain this result, there is provided a conical frame 9 the central portion 10 of which engages the upper end of the conical spring 7. A plurality of legs 11 connect the frame 9 to the base plate 3 and for this purpose the legs 11 may conveniently be extended through the aperture 12 with the lower ends 14 extending beneath the base plate 3 where they are held in engagement with the base plate by the action of the conical spring 7. Preferably, the aperture 12 is substantially the same size in inner diameter of the main spring 1 so that these legs 11, or more specifically the lower portions thereof, are in substantial contact with the lower portion of the main spring 1 and serve to position that spring horizontally relative to the base member 3. A rod or pin 15 extending through an aperture 16 in the spider 9 serves as a connection between the load engaging member 2 and the lower portion of the conical spring 7, there being employed for this purpose a head portion 17 on the lower end of the rod 15 which engages the lower end of the spring 7.

In order to provide the desired non-linear snubbing action to quickly limit vibratory movement of the load supporting member 2 either upwards or downwards and to restrict the dynamic deflection of the entire mount to a relatively narrow range, it is essential that when the vibration damping support is carrying a given static load, either a substantial increase or decrease in the effective load on the support resulting from a vibratory movement of the load causing dynamic deflection of the vibration mount should be counteracted by those portions of the spring assembly having non-linear deflection characteristics. Therefore, the springs 1 and 7 are so designed that when a load 20 is placed on the load engaging member 2 and a maximum designed downwards dynamic vibratory force is exerted on member 2 all of the turns of the cylindrical portion of the load carrying spring 1 are almost bottomed; the term "almost" as used herein in connection with the cylindrical portion referring to a condition in which the static load is from 85 to 95 percent that required for complete bottoming of the cylindrical portion 4. In other words this portion of the spring which has a linear as distinguished from a non-linear load-deflection curve or characteristic as static loaded to the point where it is 85 to 95 percent compressed but is not completely compressed. As a further critical aspect of the present invention, when the vibration mount is carrying the load 20, it is essential that the snubber spring 7 be substantially uncompressed but in a condition such that it can offer immediately a progressively increasing resistance to dynamic deflection as a result of the vibration forces tending to compress the spring 7. Therefore, the spring 7 is so constructed and arranged that any upward movement of the load engaging member 2 from the static load carrying position is opposed by the conical spring 7. Also, and in a similar manner with all of the cylindrical portion of the main spring 1 in a fully compressed or bottomed position when carrying the load 20, the downward component of the vibratory movement of the load engaging member 2 are opposed non-linearly by the tapered or conical portion 5 of the main spring.

Figure 3:
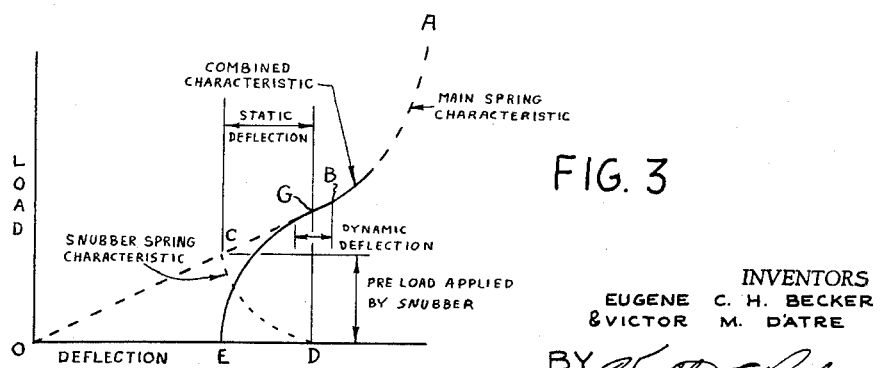
Fig. 3 is a graphical representation of the operation of the vibration damping support of the present invention and its components.

The operation and essential characteristics of the vibration mount of the present invention may best be illustrated by reference to Fig. 3 of the drawing in which there is plotted the load-versus-deflection characteristics of the main spring 1, the tapered or conical snubber spring 7 and the combined spring assembly of these two springs 1 and 7. With reference to Fig. 3 the dotted line OA represents the load-deflection curve of the main spring 1. It will be noted that this curve comprises a straight portion OB due to the fact that the main spring 1 deflects linearly with increased load up to the point B where the various turns of the cylindrical portion 4 of that spring are bottomed. Thereafter the only possible deflection under increasing load is that obtainable by the conical or tapered portion 5 of the main spring 1. As this increases non-linearly with increased load, that the remaining portion of this curve BA curves upward.

As the spring 7 is arranged in the mount to oppose the action of the main spring 1 and to be in a substantially unloaded state when the main spring 1 is carrying the load 20, the spring characteristic of the spring 7 is shown in Fig. 3 by the non-linear curve CD. This spring, carrying no load at point D when the main spring is loaded statically to a deflection corresponding to point G is deflected to point C by the action of the main spring under no load conditions. Point G, of course, represents a load of from 85 to 95 percent that required to fully compress the spring portion 4 to point B.

With further reference to Fig. 3, the combined action of the springs 1 and 7 is represented by the curve EGBA, this curve being non-linear except for a short distance on each side of the point G which may be referred to as the normal range of dynamic deflection of the spring assembly due to normal vibratory movement of the load 20 relative to the base plate 3. In this curve, the portion EG is the summation of the spring characteristics of the main spring 1 and the tapered spring 7 while the portion BA represents the spring characteristic of only the tapered portion 5 of the main spring 1 under conditions in which the forces on the spring assembly are greater than the static load forces.

It will also be seen from a consideration of the curve EGBA of Fig. 3, that in order to take full advantage of the snubbing characteristics of the spring 7, it is desirable that in unloaded condition of the mount, the snubber spring 7 should be completely compressed by the action of the main spring 1 between the base plate 3 and the load engaging member 2. It is also desirable that both the snubber spring 7 and the tapered portion 5 of the main spring 1 be composed of only a few turns, for example, two, three or four complete turns or coils, in order that these components, which are not essential for load carrying purposes, do not obstruct the dynamic deflections of the mount.

Besides providing a desirable snubbing action, the non-linear features of both main and snubber springs are important in that they enhance the lateral stability of the mount and thus limit deflections of the mount due to the actions of forces directed at angles to the center lines of the main and snubber springs.

Summarizing the characteristics of the vibration mount, it will be seen that there is provided an ideal load-deflection characteristic represented by the curve EGBA which is of such a shape that deflection on both sides of the static load point G becomes non-linear as the curve increases in steepness on both sides of the narrow dynamic range on each side of the static load position G. The spring assembly designed to provide these results requires a main or load supporting spring having essentially a cylindrical portion and a tapered portion which together in the no-loaded condition serve to compress the tapered or snubber spring 7 through its entire amplitude. In order that the snubber spring 7 be substantially uncompressed under the effect of the load 20 so that there is produced an initial relatively "soft" resistance to vibrations within the normal dynamic deflection range, the spring 7 should be substantially uncompressed under the load carrying conditions, since otherwise the snubber spring 7 and the tapered portion of the spring 5 would be acting in opposition to one another in such a manner that there would be obtained a relatively rigid spring assembly having a steeper spring characteristic under the loaded condition and therefore having an initially hard rather than soft resistance to vibratory movement.

Figure 2:
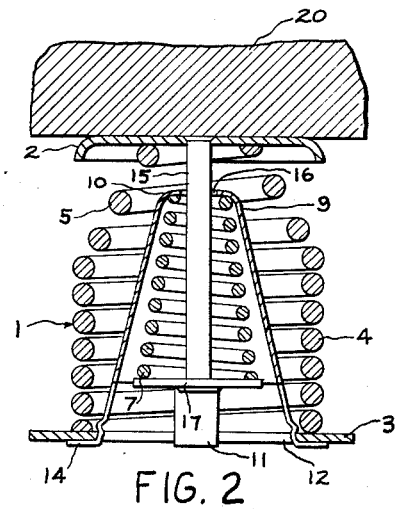
Fig. 2 is the view similar to Fig. 1 showing the vibration damping support in its loaded condition.
Figure 4:
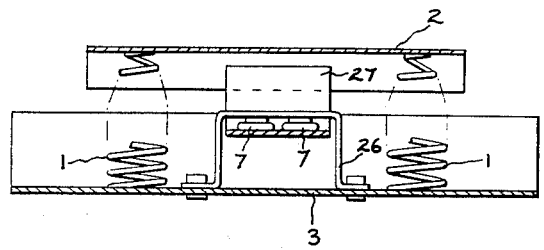
Fig. 4 is an elevational view, partly in section, of a modified form of the present invention.

In Fig. 4 of the drawing there is shown an alternative form of the present invention in which there is employed a pair of load supporting springs 1 and a pair of tapered springs 7. In this figure, in which the same reference numerals are employed to designate the same or similar parts, the main springs 1 are positioned between the base 3 and the load supporting member 2. The snubber springs 7 are arranged in opposition to the load carrying spring 1 between a first yoke or U-shaped member 26 connected to the base member or plate 3 and a second U-shaped member 27 which is connected to the load engaging member 2 and which links the U-shaped member 26 so that the conical springs 7 are in engagement with the center or base portions of the two U-shaped members 26 and 27 and are, in the no-loaded condition completely compressed by the action of the main springs 1. The load-deflection characteristics of this spring assembly are the same as those for the modification shown in Figs. 1 and 2 of the drawing. From a consideration of these two modifications, it will become apparent that further modifications of the present invention are possible which will provide the same desirable non-linear vibration damping characteristics. For example, a single heavier main spring could be substituted for the two tapered springs 7 in the arrangement shown in Fig. 4, and in opposition to this main spring, only one snubber spring would be required.

Therefore while there has been disclosed specific embodiments of the present invention, it is to be understood that the invention is not limited thereto and it is intended by the appended claim to cover all modifications within the spirit and scope of the invention.

What we claim as new and desire to secure by Letters Patent of the United States is:

A vibration damping spring mount comprising a base member and a load engaging member, a main load supporting compression spring between and in engagement with said members, said main spring including an essentially cylindrical portion and a tapered portion, a completely tapered compression snubber spring arranged within and in spaced relation with said main spring, and means connecting said snubber spring to both of said members for opposing the action of said main spring, said connecting means including a pin extending from one of said members through said tapered spring and having a head portion engaging the end of said tapered spring adjacent the other of said members and a spider frame between said springs engaging the other end of said tapered spring and fixedly connected to the other of said members, the snubber spring being overlapped for its whole length by the main spring.

References Cited in the file of this patent

UNITED STATES PATENTS

| | | |
|---|---|---|
| 274,715 | Buckley | Mar. 27, 1883 |
| 653,155 | Tilden | July 3, 1900 |
| 1,546,729 | Groh | July 21, 1925 |
| 2,359,917 | Hussman | Oct. 10, 1944 |